(12) United States Patent
Bothe

(10) Patent No.: US 11,448,796 B2
(45) Date of Patent: Sep. 20, 2022

(54) EVALUATION METHOD FOR THE COVERAGE OF A COATING ON A CONTACT LENS SURFACE

(71) Applicant: ALCON INC., Fribourg (CH)

(72) Inventor: Harald Bothe, Niedernhausen (DE)

(73) Assignee: Alcon Inc., Fribourg (CH)

( * ) Notice: Subject to any disclaimer, the term of this patent is extended or adjusted under 35 U.S.C. 154(b) by 805 days.

(21) Appl. No.: 16/381,475

(22) Filed: Apr. 11, 2019

(65) Prior Publication Data

US 2019/0317247 A1    Oct. 17, 2019

Related U.S. Application Data

(60) Provisional application No. 62/657,025, filed on Apr. 13, 2018.

(51) Int. Cl.
| | |
|---|---|
| C08J 7/056 | (2020.01) |
| G02B 1/04 | (2006.01) |
| C08J 7/04 | (2020.01) |
| C08G 18/62 | (2006.01) |

(52) U.S. Cl.
CPC ............. *G02B 1/04* (2013.01); *C08J 7/0427* (2020.01); *C08J 7/056* (2020.01); *G02B 1/043* (2013.01); *C08G 18/6212* (2013.01); *C08G 2210/00* (2013.01); *C08J 2329/04* (2013.01)

(58) Field of Classification Search
CPC .......... G02B 1/04; G02B 1/043; C08J 7/0427; C08J 7/056; C08J 2329/04; C08G 18/6212; C08G 2210/00; B29D 11/0038; B29D 11/0098
USPC ........................................................ 264/1.32
See application file for complete search history.

(56) References Cited

U.S. PATENT DOCUMENTS

| | | |
|---|---|---|
| 3,408,429 A | 10/1968 | Wichterle |
| 4,347,198 A | 8/1982 | Ohkada et al. |
| 5,461,433 A | 10/1995 | Nakabayashi et al. |
| 5,508,317 A | 4/1996 | Mueller |
| 5,583,163 A | 12/1996 | Müller |
| 5,583,463 A | 12/1996 | Merritt |
| 5,789,464 A | 8/1998 | Mueller |
| 5,849,810 A | 12/1998 | Mueller |
| 6,218,508 B1 | 4/2001 | Kragh et al. |
| 6,303,687 B1 | 10/2001 | Müller |
| 6,627,124 B1 | 9/2003 | Herbrechtsmeier et al. |
| 6,800,225 B1 | 10/2004 | Hagmann et al. |
| 7,384,590 B2 | 6/2008 | Kelly et al. |
| 7,387,759 B2 | 6/2008 | Kelly et al. |
| 8,529,057 B2 | 9/2013 | Qiu et al. |
| 10,962,803 B2 * | 3/2021 | Zhang .................... G02C 7/049 |
| 11,061,169 B2 * | 7/2021 | Chang ...................... G02C 7/04 |
| 2013/0337160 A1 | 12/2013 | Holland |
| 2015/0092156 A1 | 4/2015 | Qiu |
| 2016/0061995 A1 | 3/2016 | Chang |
| 2018/0079158 A1 | 3/2018 | Qiu |

FOREIGN PATENT DOCUMENTS

| | | |
|---|---|---|
| EP | 1465931 B1 | 8/2007 |
| WO | 02/071106 A1 | 9/2002 |

OTHER PUBLICATIONS

PCT International Search Report, PCT/IB2019/053007, dated Aug. 5, 2019, 4 pages.
PCT Written Opinion of the International Search Authority, PCT/IB2019/053007, dated Aug. 5, 2019, 5 pages.

* cited by examiner

*Primary Examiner* — Hannah J Pak

(57) ABSTRACT

The invention provides a method for determining whether a coated contact lens is completely covered by a covalently bonded coating, comprising the steps of (1) providing a coated polyvinylalcohol-based hydrogel contact lens wherein the polyvinylalcohol-based hydrogel lens body is composed of a polymer comprising at least 50% by mole of repeating units of vinyl alcohol, comprising a lubricious coating covalently attached to the lens body, (2) contacting the coated polyvinylalcohol-based hydrogel contact lens with an aqueous solution of a hydrophilic marker polymer for obtaining a treated contact lens, the hydrophilic marker polymer having reactive groups of

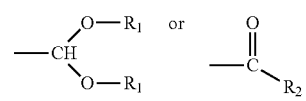

in which $R_1$ is methyl or ethyl and $R_2$ is hydrogen or a $C_1$-$C_4$ alkyl and a dye tag moiety, at a pH of 4.0 or less for a contacting time to covalently attach the marker polymer onto the coated polyvinylalcohol-based hydrogel contact lens through 6-membered acetal rings, (3) determining whether marker polymer is (covalently) attached to the surface of the treated contact lens.

15 Claims, 2 Drawing Sheets

EVALUATION METHOD FOR THE COVERAGE OF A COATING ON A CONTACT LENS SURFACE

This application claims the benefits under 35 USC 119(e) of U.S. provisional application Ser. No. 62/657,025 filed on Apr. 13, 2018, incorporated herein by reference in its entirety.

This invention is related to a method for determining whether a coated polyvinylalcohol-based (i.e., PVA-based) contact lenses is completely covered by a lubricious coating covalently attached onto the polyvinylalcohol-based hydrogel lens body through 6-membered acetal rings.

BACKGROUND

New non-silicone hydrogel contact lenses having a superior surface lubricity are highly requested on the market due to superior wearing comfort. Enhanced surface lubricity is particularly obtained by coating a preformed polyvinylalcohol-based hydrogel contact lens with a lubricious coating covalently attached to the lens body. In particular, the coating comprises a layer of a hydrophilic surface lubricity enhancer polymer which covalently attaches to the lens body. The hydrophilic surface lubricity enhancer polymer may be a linear or branched polymer comprising repeating units of a vinylic monomer having a reactive group of

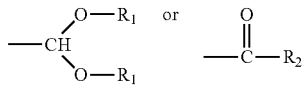

in which $R_1$ is methyl or ethyl and $R_2$ is hydrogen or a $C_1$-$C_4$ alkyl, and wherein the layer of the hydrophilic polymer is covalently attached onto the polyvinylalcohol-based hydrogel lens body through 6-membered acetal rings resulting in a contact lens having a surface lubricity better than the lubricity of the polyvinylalcohol-based hydrogel lens body.

Homogeneity and uniformity of the coating however plays a key role in obtaining excellent lubricity of the contact lens. The coating process has therefore to be minutely controlled for achieving homogeneity and uniformity of the coating.

Therefore, there is a need for determination of the uniformity of the coating on the surface of the contact lens.

SUMMARY

The invention provides a method for determining whether a coated contact lens is completely covered by a covalently bonded coating, comprising the steps of (1) providing a coated polyvinylalcohol-based hydrogel contact lens wherein the polyvinylalcohol-based hydrogel lens body is composed of a polymer comprising at least 50% by mole of repeating units of vinyl alcohol, comprising a lubricious coating covalently attached to the lens body, (2) contacting the coated polyvinylalcohol-based hydrogel contact lens with an aqueous solution of a hydrophilic marker polymer having reactive groups of

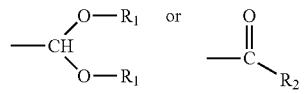

in which $R_1$ is methyl or ethyl, particularly methyl, and $R_2$ is hydrogen or a $C_1$-$C_4$ alkyl, particularly hydrogen, and a dye tag moiety, at a pH of 4.0 or less, particularly 3.5 or less, more particularly 3.0 or less, in particular from 0.5 to 2.5, for a contacting time to covalently attach the marker polymer onto the coated polyvinylalcohol-based hydrogel contact lens through 6-membered acetal rings, (3) determining whether marker polymer is (covalently) attached to the surface of the treated contact lens.

DETAILED DESCRIPTION

Figure 1:
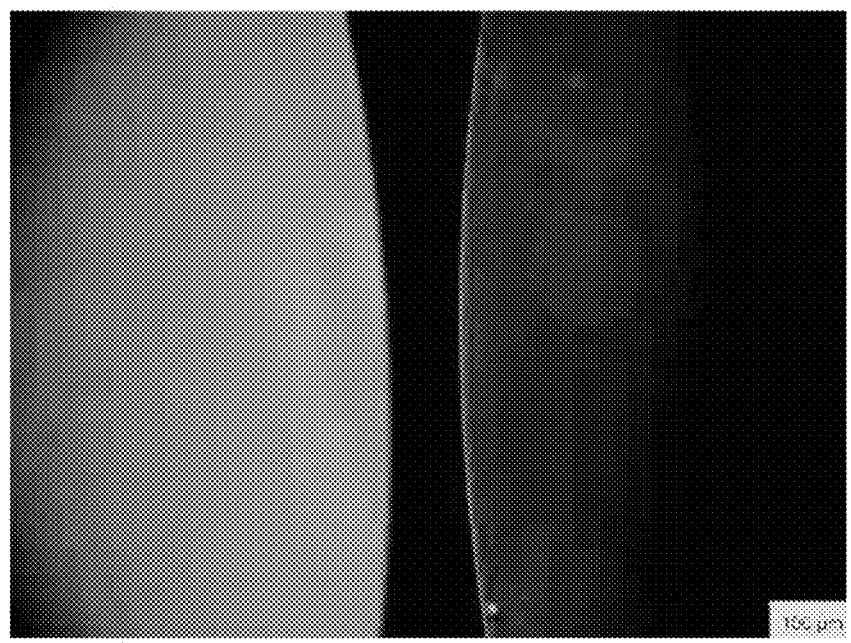
FIG. 1 is a picture of an uncoated (left) and IPC coated DACP (right) contact lens below a fluorescence microscop after treatment according example 2 with F-poly (AA-co-Ac) (50× magnification, lenses are immersed in a PBS solution).

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

A "contact lens" refers to a structure that can be placed on or within a wearer's eye. A contact lens can correct, improve, or alter a users eyesight, but that need not be the case.

A "soft contact lens" refers to a contact lens which has an elastic modulus (i.e., Young's modulus) of less than 2.5 MPa.

As used in this application, the term "hydrogel" or "hydrogel material" refers to a crosslinked polymeric material which is insoluble in water, but can hold at least 10 percent by weight of water in its three-dimensional polymer networks (i.e., polymer matrix) when it is fully hydrated.

A "vinylic monomer" refers to a compound that has one sole ethylenically-unsaturated group.

A "lubricious coating" refers to a coating that can impart increased surface hydrophilicity and increased lubricity.

An "averaged value of lubricity/lubricating drag/coefficient of friction" refers to a value, which is obtained by averaging measurements of at least 3 individual medical devices, as described in Example 10. Lubricity/lubricating drag/coefficient of friction (hereinafter CoF) may be one of important parameters that may affect the on-eye movement and thereby the wearer's comfort. High CoF may increase the likelihood of damaging mechanically the ocular epithelia and/or may lead to ocular discomfort.

As used herein, "increased lubricity" in reference to a coated contact lens means that the coated contact lens has a reduced averaged value of CoF relative to a uncoated contact lens, wherein both coated and uncoated contact lenses are made of the same core material.

An "average contact angle" refers to a contact angle (measured by Sessile Drop method), which is obtained by averaging measurements of at least 3 individual medical devices.

As used herein, "increased surface hydrophilicity" or "increased hydrophilicity" in reference to a coated ophthalmic device means that the coated ophthalmic device has a reduced averaged contact angle.

The term "soluble", in reference to a compound or material in a solvent, means that the compound or material can be dissolved in the solvent to give a solution with a concentration of at least about 0.1% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C< group. Exemplary ethylenically unsaturated groups include without limitation

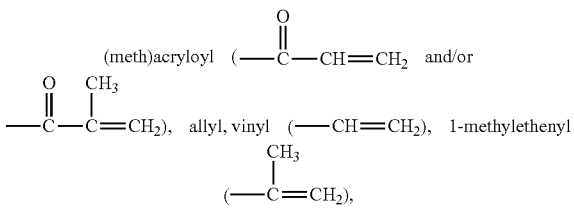

styrenyl, or the likes.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "vinylic crosslinker" refers to a compound having at least two ethylenically unsaturated groups. A "vinylic crosslinking agent" refers to a vinylic crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$alkylamino, halogen atom (Br or Cl), and combinations thereof.

In this application, a "6-membered acetal ring" refers to a moiety of

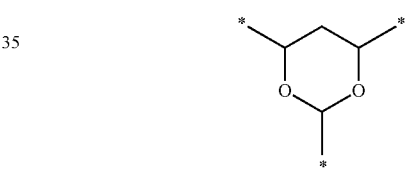

which can be formed in an acid-catalyzed reaction between a 1,3-diol moiety

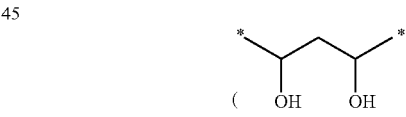

and a group of

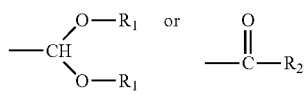

in which $R_1$ is methyl or ethyl and $R_2$ is hydrogen or a $C_1$-$C_4$ alkyl or

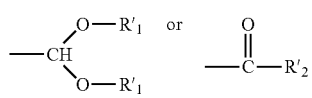

in which $R'_1$ is methyl or ethyl and $R'_2$ is hydrogen or a $C_1$-$C_4$ alkyl.

In this application the term "azetidinium" or "3-hydroxyazetidinium" refers to a positively-charged, divalent radical (or group or moiety) of

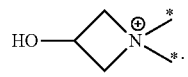

The term "azlactone" refers to a mono-valent radical of formula

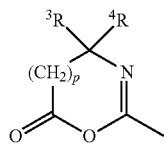

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

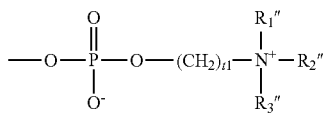

in which t1 is an integer of 1 to 5 and $R_1"$, $R_2"$ and $R_3"$ independently of one another are $C_1$-$C_8$ alkyl or $C_1$-$C_8$ hydroxyalkyl.

In this application, an "oxazoline" refers to a compound of

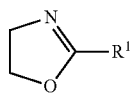

in which $R^1$ is hydrogen, $C_1$-$C_{18}$ alkyl, $C_1$-$C_4$ alkyl-substituted phenyl, $C_1$-$C_4$-alkoxy-substituted phenyl, $C_6$-$C_{18}$ aryl radical, N-pyrrolidonyl-$C_1$-$C_4$ alkyl, a monovalent radical of -alk-$(OC_2H_4)_{m3}$—OR" (in which alk is $C_1$-$C_6$ alkyl diradical, R" is $C_1$-$C_4$ alkyl, preferably methyl, and m3 is an integer from 1 to 10 (preferably 1 to 5)), preferably $R^1$ is methyl, ethyl, propyl, N-pyrrolidonyl-$C_1$-$C_4$ alkyl, a monovalent radical of -alk-$(OC_2H_4)_{m3}$—OR" (in which alk is $C_1$-$C_6$ alkyl diradical, R" is $C_1$-$C_4$ alkyl, preferably methyl, and m3 is an integer from 1 to 10 (preferably 1 to 5)).

In this application, the term "polyoxazoline" refers to a linear polymer having a formula of

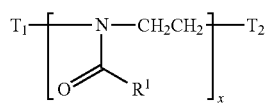

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

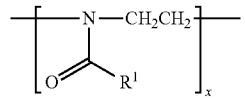

in which $R^1$ and x are as defined above.

In this application, the term "poly(2-oxazoline-co-ethyleneimine)" refers to a statistical copolymer having a formula of

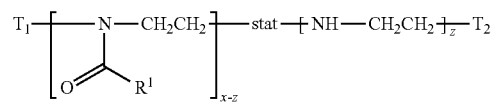

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (90%) of the secondary amine groups of the poly(2-oxazoline-co-ethyleneimine) into azetidinium groups. Examples of poly(2-oxazoline-co-ethyleneimine)-epichlorohydrin are disclosed in U.S. Pat. Appl. Pub. No. US 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

An "initiator" refers to a chemical that can initiate free radical crosslinking/polymerizing reaction.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light)

impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627, 124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

In general, the invention is directed to a method for determining whether a coated contact lens is completely covered by a covalently bonded coating comprising a polyvinylalcohol-based hydrogel lens body and a lubricious coating covalently attached to the hydrogel lens body.

The invention is partly based on the discovery that a hydrophilic marker polymer comprising a dye tag moiety and having reactive groups each capable of reacting with one 1,3-diol unit to form a 6-membered ring will selectively react with the alcoholic functions of a polyvinylalcohol-based hydrogel contact lens in a water-based coating process, as illustrated in Scheme I. The formed acetal rings are highly stable against hydrolytical or thermal decomposition reactions and thereby the hydrophilic marker polymer is stably anchored onto the polyvinylalcohol-based contact lens.

Additionally, the hydrophilic marker polymer may comprise an additional group, such as modified acrylic acid esters such as methylester, ethylester, propylester or PEG (polyethyleneglycol) or PPO. The introduction of such hydrophobic chains results in better contrast of the final contact lens to be analyzed.

In one aspect, the invention provides a method for determining whether a coated contact lens is completely covered by a covalently bonded coating, comprising the steps of (1) providing a coated polyvinylalcohol-based hydrogel contact lens wherein the polyvinylalcohol-based hydrogel lens body is composed of a polymer comprising at least 50% by mole of repeating units of vinyl alcohol, comprising a lubricious coating covalently attached to the lens body, (2) contacting the coated polyvinylalcohol-based hydrogel contact lens with an aqueous solution of a hydrophilic marker polymer having reactive groups of

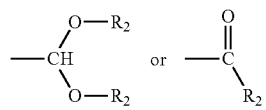

in which $R_1$ is methyl or ethyl, particularly methyl, and $R_2$ is hydrogen or a $C_1$-$C_4$ alkyl, particularly hydrogen, and a dye tag moiety, at a pH of 4.0 or less, particularly 3.5 or less, more particularly 3.0 or less, in particular from 0.5 to 2.5, for a contacting time to covalently attach the marker polymer onto the coated polyvinylalcohol-based hydrogel contact lens through 6-membered acetal rings, (3) determining whether marker polymer is (covalently) attached to the surface of the treated contact lens.

By optically evaluating the resulting surface of the contact lens allows determination whether the coated preformed polyvinylalcohol-based hydrogel contact lens is completely covered by a coating or not. When the coated preformed polyvinylalcohol-based hydrogel contact lens is completely covered by a coating, no marker polymer will covalently bond to the surface of the contact lens, whereas a partially coated contact lens surface or even the absence of a coating on the contact lens surface will result in covalent bonding of the marker polymer. The resulting surface of the treated contact lens is then evaluated, for example by an optical method sensible to the dye tag moiety of the covalently bonded marker polymer. An optical method sensible to the dye tag moiety is an optical method which allows for determination of the presence of marker polymer on the contact lens. In particular, microscopy is used for the visualization of the surface of the contact lens.

Marker polymers according to the present invention comprise reactive groups of

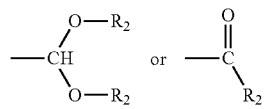

in which $R_1$ is methyl or ethyl, particularly methyl, and $R_2$ is hydrogen or a $C_1$-$C_4$ alkyl, particularly hydrogen, for covalent bonding to the polyvinylalcohol-based hydrogel lens body, and a dye tag moiety. Such tag may be a dye tag moiety absorbing visible light, such as azo dyes, reactive dyes, triarylmethane dyes, etc.

Alternatively, the marker polymer comprises a luminescent moiety, in particular a photoluminescent moiety emitting light by exposure to an adequate electromagnetic radia- Scheme I

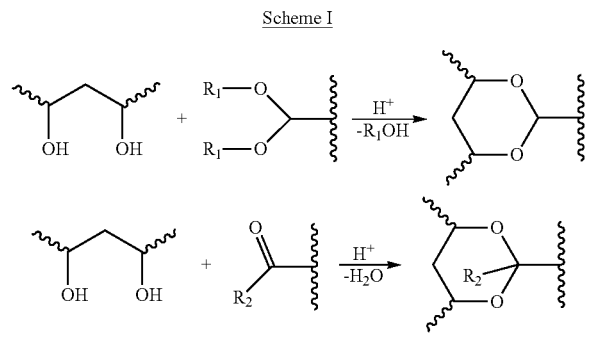

tion such as a fluorescent dye moiety, for example a fluorone derivative moiety such as fluorescein moiety, rhodamine moiety or erythrosine moiety, or other fluorescent dye moiety such as pyranine moiety, moieties with oxazine, coumarin, pyrazine, pyrene, naphtalimide, fluoranthrene, carbopyronin functionalities In particular, the coated contact lens is treated with an amount of polymer marker in excess of the amount which would covalently attach to an uncoated contact lens surface.

Once the coated polyvinylalcohol-based hydrogel contact lens contacted the aqueous hydrophilic marker polymer solution, and after optional rinsing of the treated contact lens, the resulting surface of the treated contact lens is evaluated by an optical method sensible to the dye tag moiety of the covalently bonded marker polymer. Rinsing may be performed by introducing the treated contact lens into a rinsing liquid, such as water, saline solutions such as phosphate buffered saline, etc. Rinsing the treated contact lens allows for excess marker polymer not covalently attached to the (uncoated portions of the) surface of the contact lens to be rinsed off the contact lens, thus only covalently bonded marker polymer, if any, remains on the contact lens.

In particular, when the marker polymer comprises a luminescent dye moiety, the treated contact lens may be exposed to an adequate electromagnetic radiation, in particular UV-light, and the resulting surface is evaluated according to the luminescence pattern which is a direct representation of the coverage of the coating on the surface of the contact lens. In particular, microscopy is used for viewing the contact lens surface. When the coverage of the contact lens by a covalently bonded coating is complete, no marker polymer will covalently bond to the surface and, after rinsing of the contact lens, illumination by UV-light adequate to induce photoluminescence of the dye tag will result in absence of photoluminescence. Although a small amount of non-covalently bonded marker polymer may be present on the surface of the contact lens, resulting in weak luminescence, the appearance of the contact lens, for example in a representation, will remain dark. When the coverage of the contact lens by the covalently bonded coating is incomplete, the marker polymer will bond to the non-coated parts of the contact lens surface and by irradiation with adequate UV-light photoluminescence will occur in the non-coated areas, resulting in luminescence of the non-coated portions of the contact lens.

In particular, fluorescence microscopy may be used for the evaluation of the completeness of the coating. In the fluorescence microscope, the treated contact lens is illuminated with light of a specific wavelength (or several different wavelengths) which is absorbed by the fluorescent moieties, causing them to emit light of longer wavelengths (i.e., of a different color than the absorbed light), particularly in the visible region of the electromagnetic radiation, as, for example, with fluorescein moieties. The illumination light is separated from the much weaker emitted fluorescence radiation through the use of a spectral emission filter.

Typical components of a fluorescence microscope are a light source, an excitation filter, a dichroic beamsplitter, and the emission filter. The filters and the dichroic beamsplitter are chosen to match the spectral excitation and emission characteristics of the fluorescent moiety used in the marker polymer.

Particularly, an epifluorescence microscope may be used, where excitation of the fluorophore and detection of the fluorescence are done through the same light path. These microscopes are known in the art and widely used in tracing techniques.

Alternatively, the dye tag moiety attached to the marker polymer may absorb electromagnetic irradiation in the visible region, leading to colored areas on the non-coated portions of the contact lens surface. These areas may be evaluated in an analogous way to the previous embodiment.

Any suitable marker polymer may be used for treating the coated polyvinylalcohol-base hydrogel contact lens so long they are water-soluble and particularly comprise about 25% or less by mole (preferably about 20% or less by mole, more preferably about 15% or less by mole, even more preferably about 10% or less by mole) of repeating units of a vinylic monomer having a reactive group of

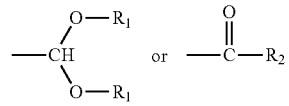

in which $R_1$ is methyl or ethyl (preferably methyl) and $R_2$ is hydrogen or a $C_1$-$C_4$ alkyl (preferably hydrogen). They can be linear or branched polymers. Such marker polymers may be prepared by copolymerizing one or more vinylic monomer having a reactive group of

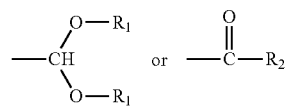

with one or more hydrophilic vinylic monomer comprising a dye tag moiety covalently bonded to the hydrophilic monomer in the presence of a vinylic crosslinking agent (i.e., for forming linear polymers) or in the absence of a vinylic crosslinking agent (i.e., for forming branched polymers), according to any polymerization techniques known to a person skilled in the art. Additionally, the marker polymer comprises a dye tag moiety, which may be attached to the condensed vinylic monomer or to any suitable position on the marker polymer.

At least part of the vinylic monomers are dye tag substituted, particularly at least 0.01 mol-% are dye tag substituted, very particularly at least 0.05% mol-% or higher are dye tag substituted. Particularly, at most 2 mol-% or less of the vinylic monomers are dye tag substituted.

Examples of vinylic monomers having a reactive group of

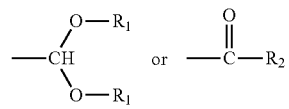

include without limitation acrolein, methacrolein, crotonaldehyde, acrolein dimethyl acetal, acrolein diethyl acetal, methacrolein dimethyl acetal, methacrolein diethyl acetal, methyl vinyl ketone, 3-methyl-3-buten-2-one, 3-penten-2-one, ethyl vinyl ketone, propyl vinyl ketone, isopropyl vinyl ketone, vinyl butyl ketone, tert-butyl vinyl ketone, iso-butyl vinyl ketone, methyl allyl ketone, and combinations thereof.

Any suitable hydrophilic vinylic monomers can be used. Examples of suitable hydrophilic vinylic monomers include without limitation carboxyl-containing vinylic monomers, primary amine-containing vinylic monomers, secondary amine-containing vinylic monomer, non-reactive hydrophilic vinylic monomers, phosphorylcholine-containing vinylic monomers, and combinations thereof.

Examples of preferred carboxyl-containing vinylic monomers include without limitation acrylic acid, methacrylic ethylacrylic acid, propylacrylic acid, butylacrylic acid, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof.

Examples of preferred primary and secondary amino-containing vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof.

In accordance with the invention, a non-reactive vinylic monomer is a vinylic monomer free of any carboxyl group, primary amine group, secondary amine group, epoxide group, isocyanate group, azlactone group, or aziridine group. Examples of preferred non-reactive hydrophilic vinylic monomers include without limitation (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

Examples of non-reactive phosphorylcholine-containing vinylic monomers include without limitation (meth)acryloyloxyethyl phosphorylcholine, those described in U.S. Pat. No. 5,461,433 (herein incorporated by reference in its entirety), and combinations thereof.

The marker polymer for treating the coated polyvinylalcohol-based hydrogel contact lens may comprise repeating units of one or more vinylic monomers selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

The marker polymer may alternatively comprise repeating units of one or more vinylic monomers selected from the group consisting of a carboxyl-containing vinylic monomer, a primary amine-containing vinylic monomer, a secondary amine-containing vinylic monomer, and combinations thereof.

The marker polymer may be prepared, for example, by polymeranalogous reaction as described in the examples or by polymerization addition of the monomer during polymerization.

The aqueous solution of a hydrophilic marker polymer particularly has a pH of about 4 or less, preferably about 3.5 or less, more preferably about 3.0 or less, even more preferably from about 0.5 to about 2.5.

The aqueous solution of a hydrophilic marker polymer particularly has a temperature of preferably from about 20° C. to about 85° C., particularly from about 25° C. to about 80° C., more particularly from about 30° C. to about 70° C.

The contacting time period is preferably about 60 seconds or less, particularly about 30 seconds or less, more particularly about 20 seconds or less, even more particularly about 10 seconds or less.

Any suitable preformed polyvinylalcohol-based hydrogel contact lenses can be used in the invention, so long as they are composed of a polymer comprising at least 50% by mole (preferably at least 60% by mole, more preferably at least 70% by mole, even more preferably at least 75% by mole of repeating units of vinyl alcohol.

In accordance with the invention, a preformed hydrogel contact lens is a contact lens that has not been subjected to any surface modification posterior to the lens-forming process well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In cast-molding, a lens formulation typically is dispensed into molds and cured (i.e., polymerized and/or crosslinked) in molds for making contact lenses.

For production of preformed polyvinylalcohol-based hydrogel contact lenses, a hydrogel lens formulation typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

In a preferred embodiment, a preformed polyvinylalcohol-based hydrogel contact lens is preferably obtained by polymerizing a water-soluble, actinically-crosslinkable polyvinyl alcohol prepolymer, comprising:

repeating units of vinyl alcohol

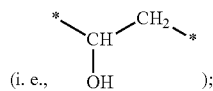

(i. e., OH);

repeating crosslinking units of formula (I); and

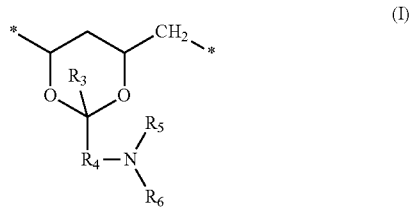

in which:
- $R_3$ can be hydrogen or a $C_1$-$C_6$ alkyl group (preferably hydrogen);
- $R_4$ is a $C_1$-$C_6$ alkylene divalent radical (preferably a $C_1$-$C_4$ alkylene divalent radical, more preferably methylene or butylene divalent radical, even more preferably methylene divalent radical);
- $R_5$ is hydrogen or $C_1$-$C_6$ alkyl (preferably hydrogen or $C_1$-$C_4$ alkyl, more preferably hydrogen or methyl or ethyl, even more preferably hydrogen or methyl);
- $R_6$ is an ethylenically unsaturated group of

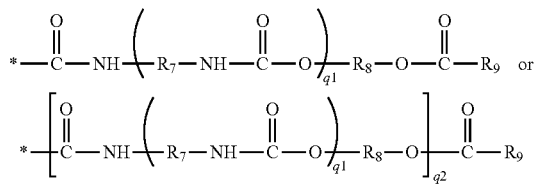

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

In another preferred embodiment, wherein $R_4$ is methylene divalent radical, $R_5$ is hydrogen or $C_1$-$C_4$ alkyl, $R_3$ is hydrogen, and $R_6$ is a radical of

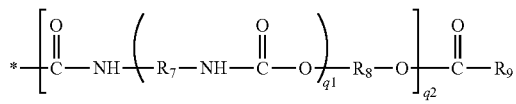

in which q2 is zero, $R_9$ is vinyl (*—CH=$CH_2$) or 1-methylethenyl (*—C($CH_3$)=$CH_2$).

In another preferred embodiment, the polyvinyl-alcohol prepolymer has a weight average molecular weight of at least about 2,000 Daltons, and comprises from about 1% to about 25% by mole, preferably from about 2% to about 15% by mole of the repeating units of formula (I).

A water-soluble, actinically-crosslinkable polyvinyl-alcohol prepolymer can be prepared using techniques known in the art, e.g., those disclosed in U.S. Pat. Nos. 5,583,163 and 6,303,687 (herein incorporated by references in their entireties).

Preferably, the polyvinyl-alcohol prepolymers are purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

It would be advantageous that the water-soluble actinically-crosslinkable polyvinylalcohol prepolymers are in a substantially pure form (e.g., purified by ultrafiltration to remove most reactants for forming the prepolymer). Therefore, after crosslinking by actinic radiation, a contact lens may require practically no more subsequent purification, such as in particular complicated extraction of unpolymerized constituents. Furthermore, crosslinking may take place in aqueous solution, so that a subsequent solvent exchange or the hydration step is not necessary.

Preferably, a preformed polyvinyl-alcohol-based hydrogel contact lens is obtained by: introducing an aqueous lens-forming composition including a water-soluble, actinically-crosslinkable polyvinyl alcohol prepolymer described above into a reusable mold and curing under a spatial limitation of actinic radiation the aqueous lens-forming composition.

Preferably, a reusable mold suitable for spatial limitation of radiation is used in the invention, the projected beam of radiation (e.g., radiation from the light source including the light in the region of 360 nm to 550 nm) limits radiation (e.g., UV radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV/visible light-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, CaF$_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

The coated polyvinylalcohol-base hydrogel contact lens may particularly be formed by contacting of a preformed polyvinylalcohol-base hydrogel contact lens with an aqueous coating solution of a hydrophilic polymer with reactive groups by dipping it into the aqueous coating solution or by spraying it with the aqueous coating solution for forming the lubricious coating. One contacting process involves solely dipping the preformed polyvinylalcohol-base hydrogel contact lens in a bath of a aqueous coating solution for a period of time or alternatively dipping the preformed polyvinylalcohol-base hydrogel contact lens sequentially in a series of bath of aqueous coating solutions for a fixed shorter time period for each bath. Another contacting process involves solely spray an aqueous coating solution. However, a number of alternatives involve various combinations of spraying- and dipping-steps may be designed by a person having ordinary skill in the art. Preferably, the step of contacting is performed by dipping the preformed polyvinylalcohol-base hydrogel contact lens in the aqueous coating solution.

The aqueous coating solution has a pH of about 4 or less, preferably about 3.5 or less, more preferably about 3.0 or less, even more preferably from about 0.5 to about 2.5.

The aqueous coating solution has a temperature of preferably from about 35° C. to about 85° C., more preferably from about 40° C. to about 80° C., even more preferably from about 45° C. to about 70° C.

The contacting time period is preferably about 30 minutes or less, more preferably about 20 minutes or less, even more preferably about 10 minutes or less, most preferably about 5 minutes or less.

Any suitable hydrophilic polymers for forming the lubricious coating can be used in the invention so long they are water-soluble and comprise about 25% or less by mole (preferably about 20% or less by mole, more preferably about 15% or less by mole, even more preferably about 10% or less by mole) of repeating units of a vinylic monomer having a reactive group of

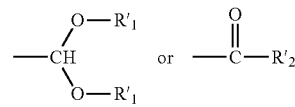

in which R'$_1$ is methyl or ethyl (preferably methyl) and R'$_2$ is hydrogen or a C$_1$-C$_4$ alkyl (preferably hydrogen). They can be linear or branched polymers. Such hydrophilic polymers for forming the lubricious coating can be prepared by copolymerizing one or more vinylic monomer having a reactive group of

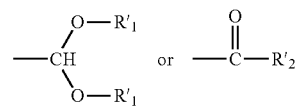

with one or more hydrophilic vinylic monomer in the presence of a vinylic crosslinking agent (i.e., for forming linear polymers) or in the absence of a vinylic crosslinking agent (i.e., for forming branched polymers), according to any polymerization techniques known to a person skilled in the art.

Examples of vinylic monomers having a reactive group of

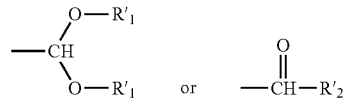

include without limitation acrolein, methacrolein, crotonaldehyde, acrolein dimethyl acetal, acrolein diethyl acetal, methacrolein dimethyl acetal, methacrolein diethyl acetal, methyl vinyl ketone, 3-methyl-3-buten-2-one, 3-penten-2- one, ethyl vinyl ketone, propyl vinyl ketone, isopropyl vinyl ketone, vinyl butyl ketone, tert-butyl vinyl ketone, iso-butyl vinyl ketone, methyl allyl ketone, and combinations thereof.

Any suitable hydrophilic vinylic monomers can be used. Examples of suitable hydrophilic vinylic monomers include without limitation carboxyl-containing vinylic monomers, primary amine-containing vinylic monomers, secondary amine-containing vinylic monomer, non-reactive hydrophilic vinylic monomers, phosphorylcholine-containing vinylic monomers, and combinations thereof.

Examples of preferred carboxyl-containing vinylic monomers include without limitation acrylic acid, methacrylic ethylacrylic acid, propylacrylic acid, butylacrylic acid, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof.

Examples of preferred primary and secondary amino-containing vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof.

In accordance with the invention, a non-reactive vinylic monomer is a vinylic monomer free of any carboxyl group, primary amine group, secondary amine group, epoxide group, isocyanate group, azlactone group, or aziridine group. Examples of preferred non-reactive hydrophilic vinylic monomers include without limitation (meth)acrylamide, N,N-dimethyl (meth)acrylamide, N-vinylpyrroli¬done (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

Examples of non-reactive phosphorylcholine-containing vinylic monomers include without limitation (meth)acryloyloxyethyl phosphorylcholine, those described in U.S. Pat. No. 5,461,433 (herein incorporated by reference in its entirety), and combinations thereof.

In particular, the hydrophilic polymer for forming the lubricious coating comprises repeating units of one or more vinylic monomers selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C°$-alkoxy polyethylene glycol (meth)acrylate having a weight average molecular weight of up to 400 Daltons, vinyl alcohol, and combination thereof.

Alternatively, the hydrophilic polymer for forming the lubricious coating comprises repeating units of one or more vinylic monomers selected from the group consisting of a carboxyl-containing vinylic monomer, a primary amine-containing vinylic monomer, a secondary amine-containing vinylic monomer, and combinations thereof. In this embodiment, the method of the invention can further comprise a step of heating the polyvinylalcohol-based hydrogel contact lens having the layer (or coating) of the hydrophilic polymer thereon in a second aqueous coating solution comprising a water-soluble thermally-crosslinkable polymeric material having azetidinium groups to form a hydrogel layer (or coating) on top of the layer (or coating) of the hydrophilic polymer.

A water-soluble and thermally-crosslinkable hydrophilic polymeric material for the coating of the preformed polyvinylalcohol-base hydrogel contact lens must comprise azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme II Scheme II

in which $X_1$ is —S—*, —OC(=O)—*, or —NR'—* in which R' is hydrogen or a $C_1$-$C_{20}$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly (alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931 (herein incorporated by reference in its entirety). A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1 (herein incorporated by reference in its entirety).

Homopolymers and copolymers of an azetidinium-containing vinylic monomer can be obtained according to the procedures described in U.S. Pat. Appl. Pub. No. 2013/0337160A1 (herein incorporated by reference in its entirety).

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS CO_2H$)—), or combinations thereof.

Another preferred class of hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer (any one of those described above) or a phosphorylcholine-containing vinylic monomer (any one of those described above); a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

Reactive vinylic monomers can be carboxyl-containing vinylic monomers (any those preferred examples described above), primary amino-containing vinylic monomers (any those preferred examples described above), or secondary amino-containing vinylic monomers (any those preferred examples described above).

More preferably, a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of (meth)acrylamide, N-vinylpyrrolidone (NVP), N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$ alkyl (meth)acrylate, and (2) at least one non-reactive hydrophilic vinylic monomer selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphorylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(N,N-dimethylacrylamide-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. App. Pub. Nos. US 2016/0061995 A1 and US2013/0337160 A1 (herein incorporated by reference in their entireties) and in U.S. Pat. No. 8,529,057 (herein incorporated by reference in its entirety).

A water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of amino group, carboxyl group, thiol group, and a combination thereof, to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 7.0 (preferably at least 7.5 (preferably at least 8.0, more preferably at least 8.5, even more preferably at least 9.0). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

Any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

The concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

The aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1.100).

The water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamidoamine-epichlorohydrin and about 25% by weight of hydrophilic moieties or second polymer chains derived from said at least one hydrophilicity-enhancing agent.

Preferably, for coating the preformed polyvinylalcohol-based hydrogel contact lens the step of heating is performed by autoclaving the polyvinylalcohol-based hydrogel contact lens with the layer (or coating) of the hydrophilic polymer thereon in the second aqueous coating solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups which do not participate in crosslinking reaction may be hydrolyzed into 2,3-dihydroxypropyl (HO—$CH_2$—CH(OH)—$CH_2$—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

The packaging solution may comprise preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for determining whether a coated contact lens is completely covered by a covalently bonded coating comprising the steps of:
   providing a coated polyvinylalcohol-based hydrogel contact lens wherein the polyvinylalcohol-based hydrogel lens body is composed of a polymer comprising at least 50% by mole of repeating units of vinyl alcohol, comprising a lubricious coating covalently attached to the lens body,
   contacting the coated polyvinylalcohol-based hydrogel contact lens with an aqueous solution of a hydrophilic marker polymer for obtaining a treated contact lens, the hydrophilic marker polymer having reactive groups of

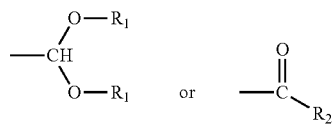

in which $R_1$ is methyl or ethyl, particularly methyl, and $R_2$ is hydrogen or a $C_1$-$C_4$ alkyl, particularly hydrogen, and a dye tag moiety, at a pH of 4.0 or less, particularly 3.5 or less, more particularly 3.0 or less, in particular from 0.5 to 2.5, for a contacting time to covalently attach the marker polymer onto the coated polyvinylalcohol-based hydrogel contact lens through 6-membered acetal rings,
   determining whether marker polymer is (covalently) attached to the surface of the treated contact lens, 2. Method of invention 1, wherein determining whether marker polymer is (covalently) attached to the surface of the treated contact lens allows for determining whether the coated preformed polyvinylalcohol-based hydrogel contact lens is completely covered by a coating.

3. Method of invention 1 or 2, wherein after contacting the coated polyvinylalcohol-based hydrogel contact lens with the aqueous solution of a hydrophilic marker polymer, the treated contact lens is rinsed before determining whether marker polymer is (covalently) attached to the surface of the treated contact lens.

4. Method of any one of inventions 1 to 3, wherein the marker polymer comprises a dye tag moiety absorbing visible light.

5. Method of any one of inventions 1 to 3, wherein the marker polymer comprises a luminescent moiety, in particular a photoluminescent moiety emitting light by exposure to an adequate electromagnetic radiation.

6. Method of any one of inventions 1 to 5, wherein the lubricious coating comprises a layer of a hydrophilic surface lubricity enhancer polymer 7. Method of any one of inventions 1 to 6, wherein the hydrophilic surface lubricity enhancer polymer is a linear or branched polymer comprising about 20% or less by mole of repeating units of a vinylic monomer having a reactive group of

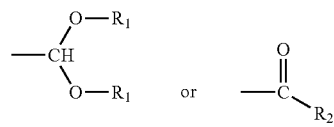

in which $R_1$ is methyl or ethyl and $R_2$ is hydrogen or a $C_1$-$C_4$ alkyl, wherein the layer of the hydrophilic polymer is covalently attached onto the polyvinylalcohol-based hydrogel lens body through 6-membered acetal rings.

8. Method of any one of inventions 1 to 7, wherein the contact lens comprises: a polyvinylalcohol-based hydrogel lens body; and a coating thereon, wherein the polyvinylalcohol-based hydrogel lens body is composed of a polymer comprising at least 50% by mole of repeating units of vinyl alcohol, wherein the coating comprises a layer of a hydrophilic polymer, wherein the hydrophilic polymer is a linear or branched polymer comprising about 20% or less by mole of repeating units of a vinylic monomer having a reactive group of

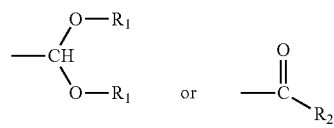

in which $R_1$ is methyl or ethyl and $R_2$ is hydrogen or a $C_1$-$C_4$ alkyl, wherein the layer of the hydrophilic polymer is covalently attached onto the polyvinylalcohol-based hydrogel lens body through 6-membered acetal rings, wherein the soft contact lens has a surface lubricity better than the lubricity of the polyvinylalcohol-based hydrogel lens body.

9. Method of invention 8, wherein the hydrophilic polymer of the coating further comprises repeating units of one or more vinylic monomers selected from the group consisting of a carboxyl-containing vinylic monomer, a primary amine-containing vinylic monomer, a secondary amine-containing vinylic monomer, a non-reactive hydrophilic vinylic monomer, a phosphorylcholine-containing vinylic monomer, and combinations thereof.

10. Method of invention 9, wherein the carboxyl-containing vinylic monomer is selected from the group consisting of acrylic acid, methacrylic ethylacrylic acid, propylacrylic acid, butylacrylic acid, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof, wherein the primary and secondary amine-containing vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, or a combination thereof, wherein the non-reactive hydrophilic vinylic monomer is (meth)acrylamide, N,N-dimethyl (meth)acrylamide, N-vinylpyrroli¬done (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, or a combination thereof.

11. Method of invention 8, wherein the hydrophilic polymer of the coating further comprises repeating units of one or more vinylic monomers selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combinations thereof.

12. Method of invention 8, wherein the hydrophilic polymer of the coating further comprises repeating units of one or more vinylic monomers selected from the group consisting of a carboxyl-containing vinylic monomer, a primary amine-containing vinylic monomer, a secondary amine-containing vinylic monomer, and combinations thereof.

13. Method of invention 11, wherein the hydrophilic polymer of the coating comprises repeating units of one or more carboxyl-containing vinylic monomers selected from the group consisting of acrylic acid, methacrylic acid, ethylacrylic acid, and combinations thereof.

14. Method of invention 11, wherein the hydrophilic polymer of the coating comprises repeating units of one or more vinylic monomers selected from the group consisting of amino-$C_2$-$C_3$ alkyl (meth)acrylate, $C_1$-$C_2$ alkylamino-$C_2$-$C_3$ alkyl (meth)acrylate, amino-$C_2$-$C_3$ alkyl (meth)acrylamide, $C_1$-$C_2$ alkylamino-$C_2$-$C_3$ alkyl (meth)acrylamide, and combinations thereof.

15. Method of any one of inventions 12 to 14, wherein the coating further comprises a hydrogel layer which is covalently attached onto the layer of the hydrophilic polymer through linkages of

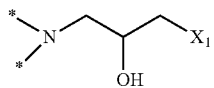

in which X1 is

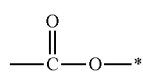

or —NR'—* in which R' is hydrogen or a $C_1$-$C_2$ alkyl group, and * represents an organic radical.

16. Method of any one of inventions 8 to 15, wherein the soft contact lens has a water content of preferably from about 15% to about 80%, more preferably from about 30% to about 72% by weight (at room temperature, about 22° C. to 28° C.), when being fully hydrated.

17. Method of any one of inventions 8 to 16, wherein the soft contact lens has an elastic modulus of from about 0.2 MPa to about 1.5 MPa (preferably from about 0.3 MPa to about 1.3 MPa, more preferably from about 0.4 MPa to about 1.1 MPa, even more preferably from about 0.5 MPa to about 1.0 MPa), when being fully hydrated.

18. Method of any one of inventions 1 to 17, wherein the coated polyvinylalcohol-based hydrogel contact lens is composed of a polymer comprising at least 60% by mole of repeating units of vinyl alcohol.

19. Method of any one of inventions 1 to 18, wherein the coated polyvinylalcohol-based hydrogel contact lens is composed of a polymer comprising at least 70% by mole of repeating units of vinyl alcohol.

20. Method of any one of inventions 1 to 19, wherein the coated polyvinylalcohol-based hydrogel contact lens is composed of a polymer comprising at least 75% by mole of repeating units of vinyl alcohol.

21. Method of any one of inventions 1 to 20, wherein $R_1$ is methyl and $R_2$ is hydrogen.

22. Method of any one of inventions 1 to 21, wherein the pH is about 3.5 or less.

23. Method of any one of inventions 1 to 21, wherein the pH is about 3.0 or less.

24. Method of any one of inventions 1 to 21, wherein the pH is from about 0.5 to about 2.5.

25. Method of any one of inventions 1 to 24, wherein the aqueous solution of the hydrophilic marker polymer has a temperature of from about 30° C. to about 85° C. during contact of the coated polyvinylalcohol-based hydrogel contact lens with the aqueous solution of the hydrophilic marker polymer.

26. Method of any one of inventions 1 to 24, wherein the aqueous solution of the hydrophilic marker polymer has a temperature of from about 35° C. to about 80° C. during contact of the coated polyvinylalcohol-based hydrogel contact lens with the aqueous solution of the hydrophilic marker polymer.

27. Method of any one of inventions 1 to 24, wherein the aqueous solution of the hydrophilic marker polymer has a temperature of from about 40° C. to about 70° C. during contact of the coated polyvinylalcohol-based hydrogel contact lens with the aqueous solution of the hydrophilic marker polymer.

28. Method of any one of inventions 1 to 27, wherein the coated polyvinylalcohol-based hydrogel contact lens contacts the aqueous solution of the hydrophilic marker polymer for a contacting time of about 60 seconds or less.

29. Method of any one of inventions 1 to 27, wherein the coated polyvinylalcohol-based hydrogel contact lens contacts the aqueous solution of the hydrophilic marker polymer for a contacting time of about 30 seconds or less.

30. Method of any one of inventions 1 to 27, wherein the coated polyvinylalcohol-based hydrogel contact lens contacts the aqueous solution of the hydrophilic marker polymer for a contacting time of about 20 seconds or less.

31. Method of any one of inventions 1 to 30, wherein the contacting time is about 10 seconds or less.

32. Method of any one of inventions 1 to 31, wherein the hydrophilic marker polymer is a linear or branched polymer comprising about 25% or less by mole of repeating units of a vinylic monomer having a reactive group of

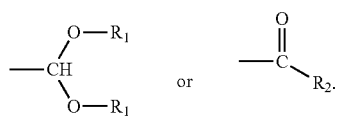

33. Method of any one of inventions 1 to 31, wherein the hydrophilic marker polymer is are a linear or branched polymer comprising about 20% or less by mole of repeating units of a vinylic monomer having a reactive group of

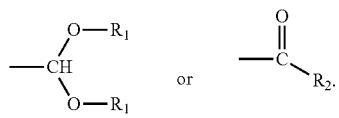

34. Method of any one of inventions 1 to 31, wherein the hydrophilic marker polymer is a linear or branched polymer comprising about 15% or less by mole of repeating units of a vinylic monomer having a reactive group of

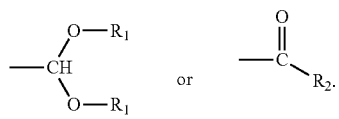

35. Method of any one of inventions 1 to 31, wherein the hydrophilic marker polymer is a linear or branched polymer comprising about 10% or less by mole of repeating units of a vinylic monomer having a reactive group of

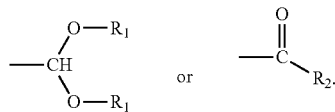

36. Method of any one of inventions 1 to 35, wherein the hydrophilic marker polymer further comprises repeating units of one or more vinylic monomers selected from the group consisting of a carboxyl-containing vinylic monomer, a primary amine-containing vinylic monomer, a secondary amine-containing vinylic monomer, a non-reactive hydrophilic vinylic monomer, a phosphorylcholine-containing vinylic monomer, and combinations thereof.

37. The method of invention 36, wherein the carboxyl-containing vinylic monomer is selected from the group consisting of acrylic acid, methacrylic ethylacrylic acid, propylacrylic acid, butylacrylic acid, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof, wherein the primary and secondary amine-containing vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, or a combination thereof, wherein the non-reactive hydrophilic vinylic monomer is (meth)acrylamide, N,N-dimethyl (meth)acrylamide, N-vinylpyrroli¬done (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, or a combination thereof.

38. Method of any one of inventions 1 to 35, wherein the hydrophilic marker polymer further comprises repeating units of one or more vinylic monomers selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combinations thereof.

39. Method of any one of inventions 1 to 35, wherein the hydrophilic marker polymer further comprises repeating units of one or more vinylic monomers selected from the group consisting of a carboxyl-containing vinylic monomer, a primary amine-containing vinylic monomer, a secondary amine-containing vinylic monomer, and combinations thereof.

40. The method of invention 39, wherein the hydrophilic marker polymer comprises repeating units of one or more carboxyl-containing vinylic monomers selected from the group consisting of acrylic acid, methacrylic acid, ethylacrylic acid, and combinations thereof.

41. Method of inventions 39, wherein the hydrophilic marker polymer comprises repeating units of one or more vinylic monomers selected from the group consisting of amino-$C_2$-$C_3$ alkyl (meth)acrylate, $C_1$-$C_2$ alkylamino-$C_2$-$C_3$ alkyl (meth)acrylate, amino-$C_2$-$C_3$alkyl (meth)acrylamide, $C_1$-$C_2$ alkylamino-$C_2$-$C_3$ alkyl (meth)acrylamide, and combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Preparation of Coated Polyvinylalcohol-Based Hydrogel Contact Lenses
Phosphate Buffered Saline (PBS)
A phosphate buffered saline is prepared by dissolving $NaH_2PO_4.H_2O$, $Na_2HPO_4.2H_2O$, and in a given volume of purified water (distilled or deionized) to have the following composition: about 0.044 w/w % $NaH_2PO_4.H_2O$, about 0.388 w/w/% $Na_2HPO_4.2H_2O$, and about 0.79 w/w % NaCl.
Coating of Polyvinylalcohol-Based Hydrogel Contact Lenses
PVA contact lenses are produced according to an automated lens manufacturing process described in Example 8-8d of WO2002071106 (herein incorporated by reference in its entirety).

Coating of a DACP contact lens with a PAA anchor coating:
A DACP contact lens was immersed for 300 s in an acidified aqueous solution (pH=2.0) of poly (acrylic acid) (Mw=450 kD; Polyscience art.-#03312-100), rinsed firstly with a PBS solution and then with water. Excess water was then removed by shaking.

In-Package-Coating Saline (IPC Saline)

IPC saline comprising a water-soluble thermally-crosslinkable polymeric material is prepared from polyamidoamine-epichlorohydrin (PAE) and poly(acrylamide-co-acrylic acid)(90/10) (i.e., poly(AAm-co-AA) 90/10 as follows.

PAE solutions of different solid contents (Kymene) are purchased from Ashland as an aqueous solution and used as received. Poly(AAm-co-AA)(90/10) partial sodium salt, poly(AAm-co-AA) 90/10, Mw 200,000) is purchased from Polysciences, Inc. and used as received.

The following components: 0.083 w/w % PAE, 0.07 w/w % poly(AAm-co-AA)(90/10), about 0.062 w/w % $NaH_2PO_4.H_2O$, about 1.245 w/w/% $Na_2HPO_4.2H_2O$, and about 0.33 w/w % NaCl, are dissolved in a target amount of purified water (distilled or deionized water). The prepared solution is placed in a container immersed in a water bath. The reaction is carried out at about 60° C. for about 6 hours. Remove the container with the solution therein from the water bath and cool it down by putting it in room temperature water, obtained the IPC saline including a water-soluble thermally-crosslinkable polymeric material. Up to 5 ppm hydrogen peroxide maybe added to the final IPC saline to prevent bioburden growth and the IPC saline is filtered using a 0.22 micron membrane filter.

PVA Lenses with Hydrogel Top Coating

PVA contact lenses with a layer (or coating) of poly (acrylic acid) are placed in a packaging shell together with 0.65 ml of the IPC saline prepared above. The shell is sealed with an Al foil and autoclaved at 121° C. for 45 min. Resultant lenses have a top hydrogel coating which is chemically attached onto the layer (or coating) of poly (acrylic acid) through linkages each formed between one azetidinium group of PAE modified with poly(AAm-co-AA) and one carboxyl group of poly (acrylic acid).

Example 2

Preparation of Poly(Acrylic Acid-Co-Acrolein)

Poly(acrylic acid-co-acrolein), poly(AA-co-Ac), was prepared by a thermal radical polymerization of a composition comprising 23.01 g (319 mmol) acrylic acid (Aldrich), 1.99 g (35.5 mmol) acrolein (Aldrich), 0.022 g (0.28 mmol) 2-mercaptoethanol (Aldrich), 0.287 g (0.89 mmol) 2'-Azobis[2-(2-imidazolin-2-yl)propane] dihydrochloride (Wako) and 228 g water at pH=3.0 for 16 h at 44° C. The reaction mixture was neutralized, diluted with water to a volume of 1000 mL and ultra-filtrated (1 kDa membrane Millipore). After freeze-drying 27.2 g of a white product was isolated. $^1$H-NMR (400 MHz, $D_2O$) δ=1.2-2.5 (maxima at 1.57, 1.73, 2.20), 2.57, 4.26, 9.32, all signals were broad. ATR-FTIR (diamond): ν=817, 1045, 1231, 1317, 1400, 1568, 1707, 2930 and 3332 $cm^{-1}$.

Preparation of Fluoresceine Labeled Poly(Acrylic Acid-Co-Acrolein, F-Poly(AA-Co-Ac)

Into a 250 mL round flask were placed 2.50 g poly(AA-co-Ac), dissolved in 1000 mL water by magnetic stirring at ambient temperature and adjusted with a 2N NaOH solution (approximately 3 mL) to pH=7.0. To the resulting solution were added 0.128 g (0.64 mmol) of of N-(3-Dimethylaminopropyl)-N-ethylcarbodiimide hydrochloride (EDC-HCl; Fluka art.-#03449) and 0.225 g (0.64 mmol) Aminofluoresceine (Aldrich art.-#201634). The solution was stirred for 5 days, then ultrafiltrated (10 kDa Millipore membrane) against water (10× volume exchange) and freeze-dried. After freeze-drying 2.9 g of an orange product with a molecular mass Mn=83.2 kDa, Mw=278 kDa (GPC: PSS Suprema columns with 100 Å, 1000 Å and 3000 Å pore sizes; PBS solution as eluent and polyacrylic acid as calibration standards) was isolated.

$^1$H-NMR (400 MHz, $D_2O$) δ=1.0-2.7 (maxima at 1.54, 2.15), 2.58, 6.62, 6.75, 7.11, 7.30, 9.43 (all signals were broad).

ATR-FTIR (diamond): ν=845, 1048, 1167, 1316, 1397, 1448, 1550, 1664, 1706, 2931, 3255 $cm^{-1}$.

UV/Vis spectroscopy (PBS solution at pH=7.0): Three maxima with absorption coefficients $\varepsilon_1$(273 nm)=0.176, $\varepsilon_2$(320 nm)=0.496 and $\varepsilon_3$(496 nm)=1.006.

Preparation of Fluoresceine Labeled Poly(AA-Co-Ac) Solution (F-Poly(AA-Co-Ac))

In a 250 mL flask equipped with a magnetic bar were poured 0.5 g of Fluoresceine labeled poly(acrylic acid-co-acrolein) and 98.0 g water (distilled or deionized). This mixture was stirred at ambient temperature until the solid was completely dissolved. Then the solution was acidified to pH=2.0 (controlled with a pH electrode) by addition of a solution of sulfuric acid (3N; approx. 1.5 g).

Treatment of Coated Polyvinylalcohol-Based Hydrogel Contact Lenses

PVA contact lenses obtained in Example 1 are dipped into 5 mL of the F-poly(AA-co-Ac) solution prepared above for 10 seconds at 30° C., thoroughly rinsed firstly for 1 min each in two glass beakers with water and then 1 min in a glass beaker with a PBS solution.

Example 3

The control experiments are performed with DAILIES® AquaComfort Plus® lenses (Alcon) without coating.

Example 4

Characterization of Contact Lenses by Fluorescence Microscopy

Lenses from Example 2 are analyzed by Microscopy under UV illumination using a Leica DM 4000 device as epifluorescence microscope with 50× enlargement. FIG. 1 shows two partial views of lenses treated with the fluoresceine labeled poly(AA-co-Ac) solution. The contact lens on the right side is a completely coated contact lens displaying no or almost no fluorescence, whereas the contact lens on the left side is a view of a DAILIES® AquaComfort Plus® lens (Alcon) without coating and therefore displaying high emmitance. Both lenses were treated with the fluoresceine labeled poly(AA-co-Ac) solution.

Characterization by Fluorescence Spectroscopy

Figure 2:
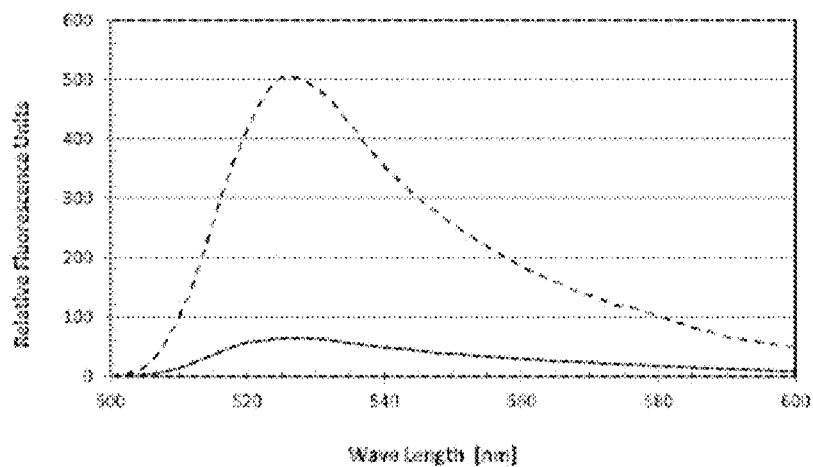
FIG. 2 Fluorescence emission spectra of a coated and uncoated DACP (dashed line) contact lens after treatment according example 4 (continuous line).

Lenses from Example 2 are as well as an uncoated DAILIES® AquaComfort Plus® lens (Alcon) from example 3—both treated with the fluoresceine labeled poly(AA-co-Ac solution were put in two wells of a culture plate (Greine Bio-On, Sensoplate 24 Well, art.-#662892) containing 2 mL PBS solution and analyzed by fluorescence spectroscopy with a Spectra Max M5 microplate reader (Molecular Devices; 485 nm excitation wavelength, 515 nm emission cut-off filter). FIG. 2 shows the resulting emission spectra of the treated lenses. While the uncoated DACP lenses shows a strong emission of fluorescence light, is the emission of the IPC coated lens significantly lower. The difference clearly allows differentiating between a coated and uncoated DACP lens.

Contact Lens Analyzing System

Figure 3:
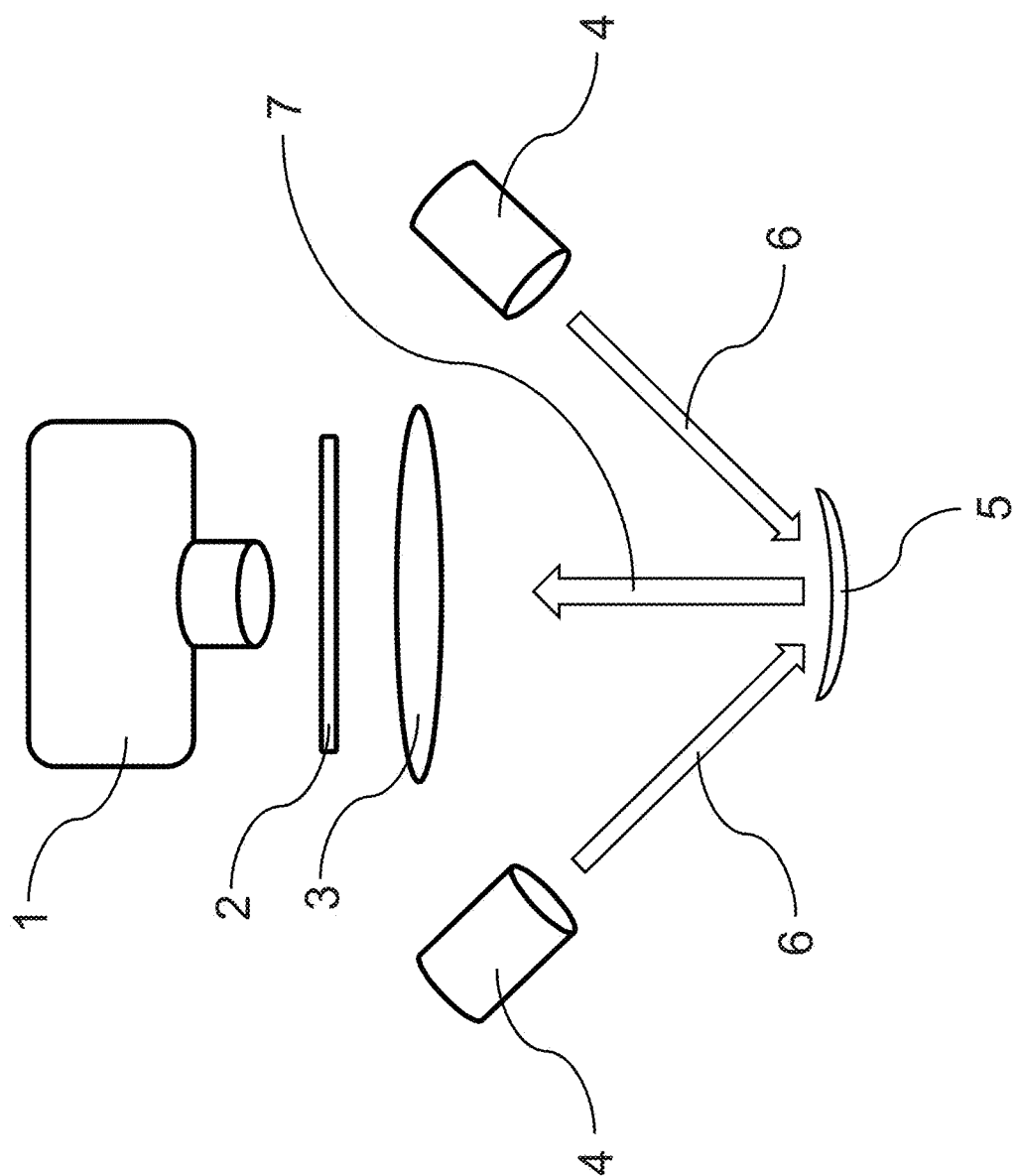
FIG. 3 Schematic design of an coating analyzing system for coated/uncoated DACP contact lenses.

FIG. 3 shows a schematic diagram of a coating analyzing system for DACP contact lens. The figure shows 1: Digital camera system, 2: cutoff filter, 3: optical magnifying system, 4: LEDs light sources, 5: contact lens sample, 6: excitation light, 7: emitted light. The analyzing system consists of LEDs 4 providing light 6 for excitation of the corresponding contact lens 5 staining compound, this compound emits the corresponding light 7 which passes a optical magnifying system 3 and a cutoff filter 2 for excitation light and is pictured in FIG. 3.

The invention claimed is:

1. A method for determining whether a coated polyvinylalcohol-based hydrogel contact lens is completely covered by a covalently bonded lubricous coating, comprising the steps of:
   providing a coated polyvinylalcohol-based hydrogel contact lens comprising a polyvinyl alcohol-based hydrogel lens body, wherein the polyvinylalcohol-based hydrogel lens body is composed of a polymer comprising at least 50% by mole of repeating units of vinyl alcohol, and the lens body has a lubricious coating covalently attached to the lens body, wherein the lubricious coating comprise a hydrophilic surface lubricity enhancing polymer,
   contacting the coated polyvinylalcohol-based hydrogel contact lens with an aqueous solution of a hydrophilic marker polymer for obtaining a treated contact lens, the hydrophilic marker polymer having reactive groups of

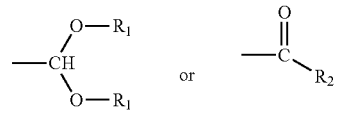

in which $R_1$ is methyl or ethyl, and $R_2$ is hydrogen or a $C_1$-$C_4$ alkyl, and a dye tag moiety, at a pH of 4.0 or less, for a contacting time to covalently attach the marker polymer onto the coated polyvinylalcohol-based hydrogel contact lens through 6-membered acetal rings;
   determining whether the marker polymer is covalently attached to the surface of the treated contact lens as an indication of whether the coated polyvinylalcohol-based hydrogel contact lens is completely covered by the lubricious coating.

2. The method according to claim 1, wherein after contacting the coated polyvinylalcohol-based hydrogel contact lens with the aqueous solution of the hydrophilic marker polymer, the treated contact lens is rinsed before determining whether marker polymer is covalently attached to the surface of the treated contact lens.

3. The method according to claim 1, wherein the marker polymer comprises a dye tag moiety absorbing visible light.

4. The method according to claim 2, wherein the marker polymer comprises a dye tag moiety absorbing visible light.

5. The method according to claim 1, wherein the marker polymer comprises a luminescent moiety.

6. The method according to claim 2, wherein the marker polymer comprises a luminescent moiety.

7. The method according to claim 1, wherein the contacting time is 60 seconds or less.

8. The method according to claim 1, wherein the aqueous solution of the hydrophilic marker polymer has a temperature of from about 30° C. to about 85° C.

9. The method according to claim 1, wherein the hydrophilic surface lubricity enhancing polymer is a linear or branched polymer comprising about 20% or less by mole of repeating units of a vinylic monomer having a reactive group of

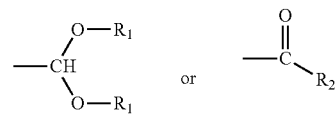

in which $R_1$ is methyl or ethyl and $R_2$ is hydrogen or a $C_1$-$C_4$ alkyl.

10. The method according to claim 1, wherein the marker polymer is a linear or branched polymer comprising 25% or less by mole of repeating units of a vinylic monomer having a reactive group of

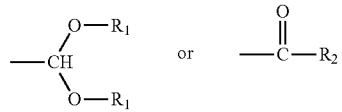

in which $R_1$ is methyl or ethyl and $R_2$ is a hydrogen or a $C_1$-$C_4$ alkyl.

11. The method according claim 1, wherein the marker polymer further comprises repeating units of one or more vinylic monomers selected from the group consisting of a carboxyl-containing vinylic monomer, a primary amine-containing vinylic monomer, a secondary amine-containing vinylic monomer, a non-reactive hydrophilic vinylic monomer, a phosphorylcholine-containing vinylic monomer, and combinations thereof.

12. The method according to claim 11, wherein the carboxyl-containing vinylic monomer is selected from the group consisting of acrylic acid, methacrylic ethylacrylic acid, propylacrylic acid, butylacrylic acid, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof, wherein the primary and secondary amine-containing vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, or a combination thereof, wherein the non-reactive hydrophilic vinylic monomer is (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2- pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, or a combination thereof.

13. The method according to claim 1, wherein the marker polymer further comprises repeating units of one or more vinylic monomers selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combinations thereof.

14. The method according claim 1, wherein the marker polymer comprises repeating units of one or more carboxyl-containing vinylic monomers selected from the group consisting of acrylic acid, methacrylic acid, ethylacrylic acid, and combinations thereof.

15. The method according to claim 1, wherein the marker polymer comprises repeating units of one or more vinylic monomers selected from the group consisting of amino-$C_2$-$C_3$ alkyl (meth)acrylate, $C_1$-$C_2$ alkylamino-$C_2$-$C_3$ alkyl (meth)acrylate, amino-$C_2$-$C_3$ alkyl (meth)acrylamide, $C_1$-$C_2$ alkylamino-$C_2$-$C_3$ alkyl (meth)acrylamide, and combinations thereof.

* * * * *